May 19, 1964 J. S. CHEVERTON ETAL Re. 25,581

PHOTOSENSITIVE LINE TRACER SCANNING HEAD

Original Filed Jan. 7, 1958 3 Sheets-Sheet 1

WITNESSES:
Bernard R. Gieguey
James F. Young

INVENTORS,
John S. Cheverton
Frans Brouwer
BY Paul E. Friedemann
ATTORNEY

PHOTOSENSITIVE LINE TRACER SCANNING HEAD

Original Filed Jan. 7, 1958 3 Sheets-Sheet 2

PHOTOSENSITIVE LINE TRACER SCANNING HEAD

Original Filed Jan. 7, 1958 3 Sheets-Sheet 3

United States Patent Office

Re. 25,581
Reissued May 19, 1964

25,581
PHOTOSENSITIVE LINE TRACER SCANNING HEAD

John S. Cheverton, Norristown, Pa., and Frans Brouwer, Glencoe, Ill., assignors, by mesne assignments, to Canadian Westinghouse Company, Limited, Hamilton, Ontario, Canada Original No. 2,933,612, dated Apr. 19, 1960, Ser. No. 707,524, Jan. 7, 1958. Application for reissue Apr. 19, 1961, Ser. No. 144,521
(Filed under Rule 47(a) and 35 U.S.C. 116)
25 Claims. (Cl. 250—202)

Matter enclosed in heavy brackets [ ] appears in the original patent but forms no part of this reissue specification; matter printed in italics indicates the additions made by reissue.

This invention relates to machine control mechanism and in particular to photo control system for controlling such machines in accordance with line drawings.

In the past it has been known to control cutting torches, for example, by means of templates which are followed by a magnetic follower or by a physical contact follower. It has also been known to control machines by means of optical control systems which include an optical scanning head which automatically follows the edge of a template by means of a comparison between the reflectivity of the template and the surrounding surface. The template in this case may simply be a drawing of the part in a color contrasting with the paper on which the drawing is made. In both such cases the machine coupled to the tracing head executes convolutions corresponding to those of the template.

With such apparatus, it is necessary that templates be produced for each contour which is to be followed. An improved system is disclosed in the Frans Brouwer patent application Serial No. 670,808, *now Patent No. 2,933,668*, filed on July 9, 1957, and entitled *Electric Motor Control System and Curve Tracer* [Electric Curve Tracer], which discloses an improved scanning head which permits the contour from a simple line drawing to be followed and reproduced While the system and control head shown in that application operates very satisfactorily, it is too complex and expensive for systems having the limited accuracy, for example, of a cutting torch.

It is therefore an object of this invention to provide a more economical form of scanning head for a line following system.

It is a further object of this invention to provide a scanning head which may be conveniently coupled to presently available apparatus to permit the apparatus to be controlled in accordance with a simple line drawing.

These and other objects are attained in this system as disclosed in the following specification and drawings, in which.

Figure 1:
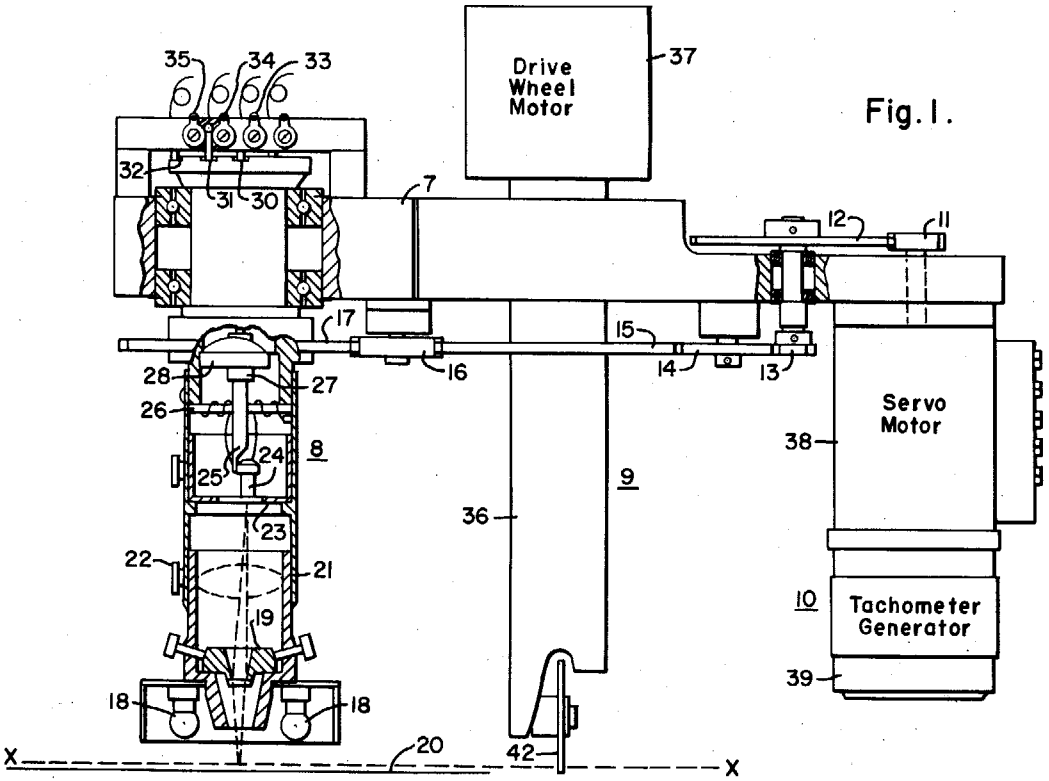
FIGURE 1 is an elevation view of the scanning head and the necessary drive mechanism, together with the steering servo-motor, the view being partially in section.

Considering first FIGURE 1, there is shown a mounting plate 7. At one end of the mounting plate a scanning head 8 is rotatably mounted. Near the middle of the mounting plate a drive wheel mechanism 9 is also rotatably mounted and at the remote end of the mounting plate a steering servo-motor and a tachometer generator assembly 10 is mounted. Both of the rotatable mechanisms are driven through a common gear train from the steering servo-motor. The pinion 11 on the shaft of the steering motor engages gear 12. Fixedly mounted on the other end of the shaft of the gear 12 is a pinion 13 which engages a further freely mounted gear 14 which in turn drives the gear 15 which is fixed to the drive wheel mechanism. Rotation of gear 15 causes the drive wheel mechanism to rotate. Gear 15 engages gear 16 which in turn drives gear 17. Gear 17 is fixed to the scanning head 8 and rotation of the gear 17 causes the scanning head to rotate. Gears 15 and 17 are of the same diameter and therefore any rotation of the wheel drive mechanism causes a corresponding rotation of the scanning head mechanism, and due to the presence of idler gear 16 the rotation is in the same direction for both mechanisms.

Considering the scanning head mechanism in detail, it will be seen that the lower portion is an annular light shield which contains lamps 18 to illuminate the line drawing. The line drawing itself is represented as a thin line 20 below the scanning head. Mounted directly on top of this annular portion is lens assembly 19 and the whole lower portion is mounted in a guide tube 21 and is adjustable relative to the guide tube by virtue of a set screw 22 in the lower assembly which passes through an oblique slot in the guide tube. Mounted in the guide tube above the farthest limit of travel of the lower portion is a ground glass focusing disc 23 and immediately above the focusing disc a photo cell 24. An aperture in the side of the guide tube permits the focusing disc to be viewed from outside the scanning head and the lower assembly adjusted relative to the guide tube to bring the line on the line drawing 20 into focus on the ground glass disc. The photo cell is not rigidly connected to the guide tube but is supported on a beam 25 which is suspended on a flat spring 26 at right angles to the beam with the ends of the flat spring rigidly supported by the guide tube. The photo cell is so mounted on the beam that the arc described by the active surface of the photo cell, when beam 25 oscillates, intersects the plane of the frosting of the glass; the frosted surface of the glass being the upper surface. At the opposite end of beam 25 is a U-shaped permanent magnet 27 having north and south poles, one at each end of the legs of the U. Rigidly mounted directly above the permanent magnet is an electromagnet 28 having an E-shaped frame with a coil on the centre leg of the E. The centre line joining the poles of the electromagnet lies directly above and parallel with the centre line joining the poles of the permanent magnet and this centre line is at right angles to the axis of the spring 26. Leads from the photocell and from the electromagnet and also from the lamps are all connected to the slip rings at the top end of the assembly. These slip rings designated 30, 31 and 32 are connected through brushes to terminals 33, 34 and 35 respectively.

The drive wheel assembly 9 will not be described in detail since it is the conventional drive wheel assembly for such mechanism. Briefly, it comprises an outer tube 36 which is fixed to gear 15 and is rotatably mounted in the mounting plate 7. At the top end of tube a motor 37 is mounted with its shaft extending down through the tube for driving drive wheel 42 through a suitable gearing.

The steering servo-motor and tachometer generator assembly 10 consists of a conventional two phase servo-motor 38 and a conventional tachometer generator 39 mounted on a common shaft. When one phase of the servo-motor is supplied from a standard source the direction and speed of the servo-motor may be controlled by the phase and amplitude of the energy supplied to the other phase. The tachometer generator produces a signal proportional to shaft velocity and other higher order differentials of the shaft position.

Figure 2:
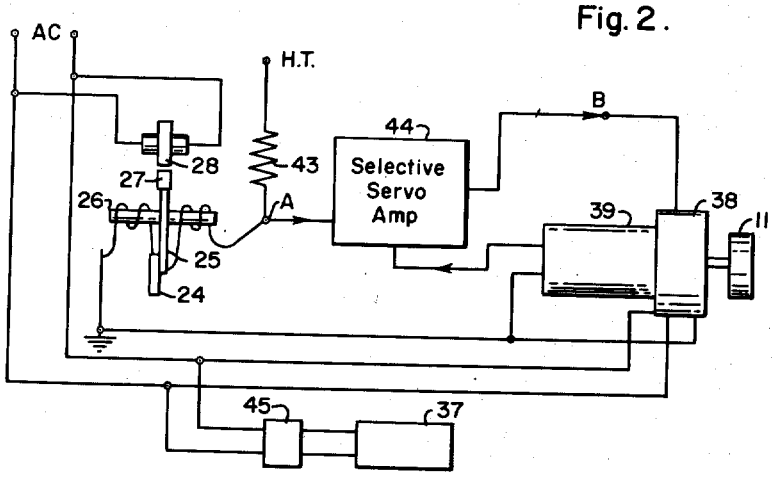
FIGURE 2 is a schematic diagram of the electrical system used in conjunction with the mechanism shown in FIGURE 1.

Considering now the electrical system shown in FIGURE 2, there is shown a load resistor 43 connected to one terminal of the photo cell. The other terminal of the photo cell is connected to ground. The necessary operating potential is applied to the upper end of load resistor 43 and the output from the photo cell load is applied to a selective servo-amplifier 44. The output from the servo-amplifier is applied to servo-motor 38 and the output from the tachometer generator 39 is applied to the servo-amplifier 44. An alternating current supply, for example, normal mains frequency is applied to the electromagnet 28 and also to the remaining phase of the servo-motor 38. The drive motor 37 is also connected to the A.C. supply or any other suitable source through a speed control device 45.

When alternating current is supplied to the electromagnet 28 the centre leg alternately becomes a north or a south pole and the outer legs similarly reverse being of the opposite polarity to the centre pole. The permanent magnet 27 being of such dimension as to span only from the centre pole of the electromagnet to one of its end poles alternately attempts to align itself on one side of the centre pole and then on the other as the alternating current reverses in direction. The permanent magnet 27 is therefore driven in synchronism with the alternating current supply. Similarly, the photo cell swings through an arc in synchronism with the permanent magnet 27. With a suitable supply to lamps 18, the drawing 20 is illuminated and the image of the drawing focused on the ground glass focusing disc, by means of the lens assembly. As the photo cell oscillates it passes back and forth over the projected image of the line drawn. The response characteristics of the photo cell may be selected as desired. It is usually preferable that the photo cell have a high red sensitivity for reasons to be later explained. As the photo cell scans the projected image of the line, the current through the photo cell varies assuming that the light reflecting quality of the line is different from that of the paper for the characteristic of the particular photo cell used.

Figure 5:
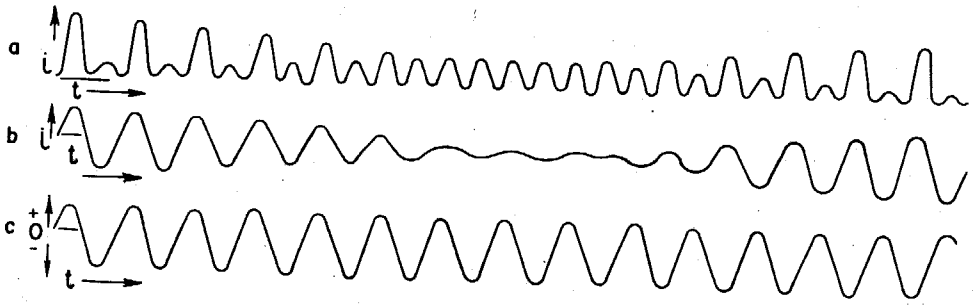
FIGURE 5 is a series of graphs representing the signals produced at various points in the system.

FIGURE 5(a) is a graph of current through the photo cell versus time. If the image of the line is displaced from the centre of the arc of oscillation of the photo cell the current through the photo cell is as shown at the beginning of FIGURE 5(a). FIGURE 5(c) is a graph of displacement of the photo cell on the basis of displacement versus time, using the same time basis as FIGURE 5(a). FIGURE 5(c) may also be assumed to be equivalent to the graph of voltage versus time of the alternating current source. Designating line displacement simply as positive and negative about a zero or centre line and similarly designating the displacement of the photo cell, it will be noted that if the projected image of the line is displaced in a negative direction then the photo cell current will produce a larger pulse during the positive swing of the photo cell and produce a lesser pulse during the negative swing of the photo cell. Proceeding further along Graph 5(a) it will be noted that the pulses gradually become equal as the line displacement becomes zero and at the latter end of Graph 5(a) a positive displacement of the projected image of the line also produces unequal pulses but in this case the greater pulse is produced when the photo cell is displaced in a negative direction and the lesser pulse is produced when the photo cell is displaced in a positive direction. The output from the load of the photo cell is applied to the selective servo-amplifier 44 which is arranged to amplify only the fundamental component of the input signal. The resultant output signal is shown at 5(b). It will be noted that during the initial portion of Graph 5(b) the output from the selective servo-amplifier is in phase with the displacement of the photo cell. As we approach the central portion of 5(b) the output gradually decreases to zero as the pulses from the photo cell become equal. At the latter end of Graph 5(b) output gain starts to increase, eventually reaching the same maximum value as it had in the first portion but in reversed phase.

As was explained previously, the steering servo-motor 38 is a two phase motor with one winding supplied from the A.C. source which therefore corresponds in phase to the signal shown at 5(c). The application of signal corresponding to 5(b) to the servo-motor therefore causes a rotation in one direction at the beginning at 5(b). The intermediate portion of the signal would cause no rotation of the servo-motor and the latter portion of the signal would cause a reverse direction of rotation of the servo-motor.

Figure 6:
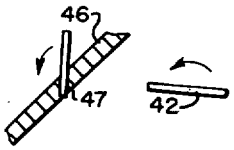
FIGURE 6 is a plan view of FIGURE 1 at the section line XX.

FIGURE 6 illustrates a plan view of the section XX in FIGURE 1 showing only a portion of the drive wheel 42, a portion of the line 46 and the projected image 47 of the photo cell which of course does not actually exist but corresponds to the pattern which would be produced on the paper if the photo cell were replaced by a light source of similar dimension. With the various elements as shown, the photo cell will produce unequal output causing a rotation of the servo-steering motor 38. This in turn causes a simultaneous rotation of the drive wheel 42 and the scanning head 8, both in the same direction as shown by the arrows in FIGURE 6. This rotation continues until the output from both the negative and positive swings of the photo cell is equal and there is no further output from the selective servo-amplifier.

As will be seen from FIGURE 1 the photo cell is not on the rotational axis of the scanning head but is slightly offset. It is offset to the rear so that in effect, due to the reversal of the optical system, it scans a point ahead of the scanning head. Therefore a rotation of the scanning head causes a rotational translational motion of the scanning path about the point of rotation of the scanning head. The translation removes the ambiguity which would exist in the system as the scanning head crosses a discontinuity in a line, for example, an abrupt corner. As long as the line is centered under the scanning head, then there is not output from the selective servo-amplifier, the steering motor does not rotate and the tracing head and drive wheel continue in a straight line. Any deviation of the path of the tracing head from the line causes an unequal output from the photo cell which again produces a fundamental frequency output from the selective servo-amplifier which again causes rotation of the steering servo-motor 38 until such time as the output from the photo cell is once again balanced.

The tracing velocity of the system is determined by the speed setting of the speed control device 15 while the direction of steering is controlled wholly by the output of the photo cell. The output from the tachometer generator is also applied to the selective servo-amplifier. This signal is in opposition to the input from the photo cell and of an amplitude primarily proportional to the velocity of the shaft of the steering motor. When there is a large deviation of the line which results in a large output from the photo cell, the selective servo-amplifier tends to produce a large output and therefore drive the steering servo-motor 38 at a high speed. However as the velocity of the steering motor increases the output from the tachometer generator increases and opposes the photo cell signal, thus reducing the output from the servo-amplifier. This effect permits the use of large amplification in the servo-loop and reduces overshoot since the maximum amplification of the loop only becomes effective when the speed of the steering motor is near zero.

Figure 3:
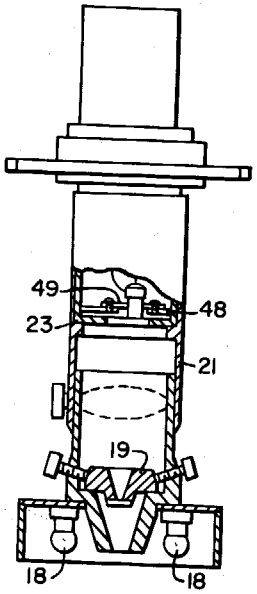
FIGURE 3 is an elevational view in section of a modified form of scanning head.

In FIGURE 3 is shown an alternative scanning head with eliminates the necessity of a vibrating assembly.

In this system a pair of photo sensitive elements or a centre tapped photo sensitive element is mounted in such a manner as to cover the normal scanning path of the vibrating type of photo cell. The two photo sensitive elements or the two halves of the centre tapped photo sensitive elements are designated 48 and 49 and rendered alternatively effective for measuring the light intensity impinging on them. The remainder of the scanning head is exactly as previously described.

Figure 4:
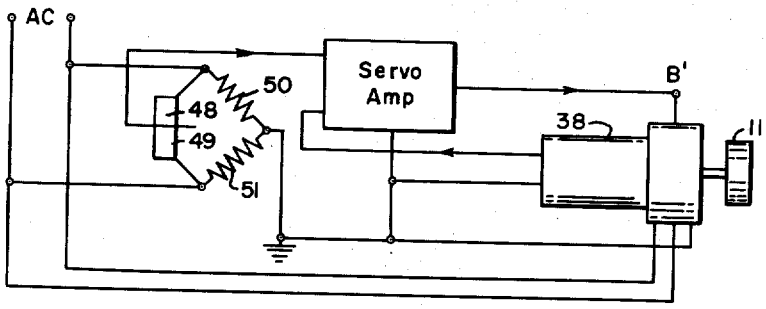
FIGURE 4 is a schematic diagram of the electrical system used in conjunction with the modified scanning head of FIGURE 3.

The associated circuit for this scanning head is shown in FIGURE 4. It will be noted that the two elements 48 and 49 constitute opposite arms of a bridge. The remaining arms of the bridge are resistors 50 and 51. With an alternating current supply connected to the junction of resistor 50 and element 48 and to the junction of resistor 51 and element 49 an output appears across the other two junctions, that is the junction of resistors 50 and 51 and the junction of elements 48 and 49 if the bridge is unbalanced. With equal light output applied to elements 48 and 49, and both elements having similar characteristics, resistors 50 and 51 are chosen to produce a zero output across the output terminals of the bridge. The output terminals of the bridge are connected directly to the servo-amplifier. In this example, the servo-amplifier does not need to be selective as the only output appearing across the output terminals will be fundamental frequency output. The output from the bridge then is essentially as shown in FIGURE 5(a) and after amplification may be utilized directly to control the servo-motor 38. As previously explained in connection with FIGURE 2 the output from the tachometer generator is supplied to the servo-amplifier in such a way as to oppose the input from the scanning head and thus produce a damped servo system. While not shown in this figure, it may be assumed that the driving motor 37 is provided with a suitable source of supply and a suitable speed control device as in the previous system. Also, as described in association with the previous circuit the photo sensitive element or elements are offset from the centre of rotation of the scanning head.

In operation of either of the systems described it will be understood that the cutting head of the machine, whether it be a gas torch or a milling head or any other type of tool, is connected in pantographic relationship with the scanning head. It will, therefore, trace out a pattern exactly corresponding to the line drawing. In operation the drive wheel does not follow the line of the drawing. Only the scanning head is constrained to follow the line. The displacement of the drive wheel is unimportant. It is only necessary that the drive wheel at all times travel in a direction parallel to the scanning head and therefore parallel to the line.

Under some circumstances it may be desirable to have the tool not follow the line drawing exactly but follow a line displaced from the line drawing by a sufficient amount to permit further machining of the cutout part. Various methods of biasing the scanning head may be used to produce this displacement, for example, by introducing a D.C. component to the electromagnet in the case of the scanning head of FIGURE 1, or by placing a small permanent magnet adjacent the vibrating magnet in such a position as to displace the centre of oscillation or by introducing an electrical bias into the amplifier. This displacement will cause a displacement of the scanning path which in turn will cause the cutting head to cut at a point somewhat displaced from the line. In the dual photo cell form a similar displacement may be produced by physically displacing the photo cell mechanically by means of an adjustable mounting device. Alternatively for either form of tracing head, the pantographic coupling between the scanning head and the cutting tool can be designed to give a difference in size.

The characteristic of the photo cell becomes important when one considers the nature of the line drawing. For example, if the surfaces are somewhat shiny photo cells having a high red response as opposed to a general response similar to the human eye will be more able to differentiate between the white surface of the paper and a black line which is to be followed. Also, if it is desired to put other markings on the drawing, other than the line to be traced, these marks may conveniently be made in red which according to the response of the photo cell will appear almost identical to the white surface of the paper.

While the system has been described using a frictional drive, under certain circumstances, for example where it is desired to control a milling cutter wihch requires large driving forces it may be advantageous to control the cutter and the tracing head by X and Y axis servo motors. A system using such X and Y driving servos is described in the aforementioned Brouwer patent application and to adapt this follower head to an X and Y drive system, it is only necessary to couple a resolver to the steering motor and derive X and Y signal proportional to steering and tracing velocity.

While certain specific examples of tracing systems have been disclosed, it will be understood that further modifications could be made in the system without departing from the scope of our invention.

We claim as our invention:

1. In a line tracing system, a scanning head for scanning a field comprising a source of illumination illuminating said scanning field, an optical system including a screen, said optical system being operable to project an image of said scanning field on said screen, and means to measure alternately the light intensity of said image at at least two selected points in said plane symmetrically arranged on each side of the front to back axis of said scanning head.

2. In a line tracing system, a scanning head for scanning a field comprising a source of illumination illuminating said field, an optical system including a screen, said optical system being operable to project an image of said field on said screen and a photo sensitive device having its active surface effectively in said plane, means to cause a repetitive relative motion of said active surface and said image in a direction transverse to the front to back axis of said scanning head, and means to derive a current from said photo sensitive device proportional to the intensity of the light impinging on the said active surface.

3. In a line tracing system *for tracing a stationary line,* a scanning head including a source of illumination for illuminating the field *containing the stationary line* to be scanned, an optical system for projecting an image of the scanning field [of the] *scanned by said* scanning head to a plane within said scanning head, a photosensitive device [essentially] *having an active surface in optical effect* in said plane, [and] electromechanical means for [oscillating] *producing relative periodic scanning motion transverse of said scanning head between said field and* said photosensitive device and thus *between said field and the* [its active] *active* surface *of said device* in said plane [and transverse of the scanning head, and], means for deriving an electric current from said photosensitive device proportional to the intensity of the light impinging on the active surface of the photosensitive device, *and means connected to said deriving means and responsive to said current for steering said head generally centered along said stationary line.*

4. In a line tracing system, a scanning head for scanning a field and including a source of illumination for illuminating said field, an optical system including a screen for projecting an image of said field on said screen, and photo sensitive means having two active areas effectively in the image plane of said screen and both areas being so disposed to be responsive to variations of light over the normal positions the image will take in said plane, means for alternately varying the sensitivity of the active surfaces, and means responsive to the average differential response of said surface for producing an electric current as a function of the shifting of the image.

5. In a line tracing system, in combination, a scanning head including a source of illumination so disposed and shielded to illuminate substantially only the area to be scanned by the scanning head, an optical system for projecting an image of the field being scanned by the scanning head to a plane within the scanning head, and photo sensitive means disposed essentially in said plane, said photo sensitive means being mounted on the end of an oscillatory beam which is free to move primarily transverse to the front and back axis of the scanning head, and means to derive an electric current from said photo sensitive means proportional to the intensity of the light impinging on the active surface of the photo sensitive means.

6. In a line tracing system, in combination, a scanning head including a source of illumination so disposed and shielded to illuminate substantially only the area to be scanned by the scanning head, a ground glass disc in the scanning head, an optical system for projecting an image of the field being scanned by the scanning head on said ground glass disc to a plane within the scanning head, and photo sensitive means disposed essentially in said plane directly above said disc, said photo sensitive means being mounted on the end of an oscillatory beam which is free to move primarily transverse to the front and back axis of the scanning head, and means to derive an electric current from said photo sensitive means proportional to the intensity of the light impinging on the active surface of the photo sensitive means.

7. In a line tracing system, a scanning head for scanning a field including a source of illumination for illuminating said field, an optical system including a screen for projecting an image of said field on said screen, and photo sensitive means having two active areas effectively in the image plane of said screen and both areas being so disposed to be responsive to variations of light over the normal positions said image will take in said plane, means for making the active surfaces operable during alternate time periods and means responsive to the average differential response of said active surfaces for producing an electric current as a function of the shifting of said image.

8. In a line tracing system, in combination, a scanning head including a source of illumination so disposed and shielded to illuminate substantially only the area to be scanned by the scanning head, an optical system for projecting an image of the field being scanned by the scanning head to a plane within the scanning head, and photo sensitive means disposed essentially in said plane, said photo sensitive means being mounted on the end of an oscillatory beam which is free to move primarily transverse to the front and back axis of the scanning head, and mounted for rotation in essentially one plane about its fulcrum, and means to derive an electric current from said photo sensitive means proportional to the intensity of the light impinging on the active surface of the photo sensitive means.

9. In a line tracing system, in combination, a scanning head including a source of illumination so disposed and shielded to illuminate substantially only the area to be scanned by the scanning head, a ground glass disc in the scanning head, an optical system for projecting an image of the field being scanned by the scanning head on said ground glass disc to a plane within the scanning head, and photo sensitive means disposed essentially in said plane directly above said disc, said photo sensitive means being mounted on the end of an oscillatory beam which is free to move primarily transverse to the front and back axis of the scanning head, and mounted for rotation in essentially one plane about its fulcrum, and means to derive an electric current from said photo sensitive means proportional to the intensity of the light impinging on the active surface of the photo sensitive means.

10. In a line tracing system, a scanning head including a source of illumination for illuminating the field to be scanned, an optical system for projecting an image of the field being scanned by the scanning head to a plane within the scanning head, a center-tapped photo transistor disposed essentially in the plane to be thus affected by the image, electric circuiting including two resistors and two outer portions of the center-tapped transistor in a bridge circuit, means for energizing the bridge circuit, whereby shifting of the image affects the transistor in such a way as to unbalance the bridge circuit as a function of the changing position of the image, and means for so moving the scanning head as to balance the bridge circuit.

11. In a line tracing system, in combination, a scanning head including a source of illumination so disposed and shielded *as* to illuminate substantially only the area to be scanned by the scanning head, [and] *an* optical system for projecting an image of the field being scanned by the scanning head to a plane within the scanning head, and photo sensitive means being mounted on the end of an oscillatory beam which is free to move on an end fulcrum so that the end carrying the photo sensitive means moves transverse of the front and back axis of the scanning head, magnetic motor means for causing said beam to oscillate about its fulcrum, and means to derive an electric current from said photo sensitive means proportional to the intensity of the light impinging on the active surface of the photo sensitive means.

12. In a line tracing system, in combination, a scanning head including a source of illumination so disposed and shielded to illuminate substantially only the area to be scanned by the scanning head, a ground glass disc disposed in the scanning head in a plane transverse of the longitudinal axis of the scanning head, an optical system for projecting an image of the field being scanned by the scanning head on said ground glass disc to a plane within the scanning head, and photo sensitive means being mounted on the end of an oscillatory beam which is free to move on an end fulcrum so that the end carrying the photo sensitive means moves transverse of the front and back axis of the scanning head, magnetic motor means for causing said beam to oscillate about its fulcrum, and means to derive an electric current from said photo sensitive means proportional to the intensity of the light impinging on the active surface of the photo sensitive means.

13. In a line tracing system, in combination, a scanning head including a source of illumination so disposed and shielded to illuminate substantially only the area to be scanned by the scanning head, a ground glass disc disposed in the scanning head in a plane transverse of the longitudinal axis of the scanning head, an optical system for projecting an image of the field being scanned by the scanning head on said ground glass disc to a plane within the scanning head, and photo sensitive means being mounted on the end of an oscillatory beam which is free to move on an end fulcrum so that the end carrying the photo sensitive means moves transverse of the front and back axis of the scanning head, magnetic motor means for causing said beam to oscillate about its fulcrum, said magnetic motor means comprising a U-shaped permanent magnet mounted on said beam and an E-shaped electromagnet mounted in said scanning head and magnetically coupled to said permanent magnet, and means to derive an electric current from said photo sensitive means proportional to the intensity of the light impinging on the active surface of the photo sensitive means.

14. Tracer apparatus for causing a tool to follow a line on a surface, said line having different reflectivity to light than the adjacent region of said surface, the said apparatus comprising means projecting an image of an elemental section of said line on a screen, light responsive means, means connected to said light responsive means for causing said light responsive means to trace a path transversely to said image, and means connected to said light responsive means and to said projecting means and responsive to said light responsive means for causing said projecting means to center said image in the region traced by said light responsive means.

15. In a line tracing system, a scanning head including a source of illumination for illuminating the field to be scanned, an optical system for projecting an image of the field being scanned by the scanning head to a plane within the scanning head, a center-tapped photo transistor disposed essentially in the plane to be thus affected by the image, and means connected to said photo transistor and to said scanning head and responsive to the difference in responses of the portions of said transistor to said image, for so moving said scanning head as to suppress said difference.

*16. In a line tracing system for tracing a stationary line optically identifiable in a scanning field, a scanning head having a reference axis generally parallel to said field, said head including an optical system for projecting an image of said scanning field to a plane within said scanning head, a photosensitive device having a photosensitive surface in optical communication with said field, means cooperative with said device for producing periodic relative scanning of said field and said surface to vary the excitation of said surface in dependence upon the intensity received by said surface from said field, said scanning being in a direction transverse to said axis and during each traverse passing continuously between the extremes of the traverse, means connected to said device for deriving an electric current from said device proportional to said excitation, and means connected to said deriving means and responsive to said current for steering said head generally centered along said stationary line.*

*17. Tracer apparatus for causing a tool to follow a curve comprising curve sensing means, means connected to said sensing means for causing said sensing means to have a back and forth sensing movement at a predetermined frequency about a center in a direction generally transverse to said curve and at the same time advancing said sensing means so as to advance said center in a direction generally along said curve, whereby said sensing means scans successive elements of said curve to produce a signal, selective means connected to said sensing means for giving predominance to component of said signal having said predetermined frequency, means connected to said selective means and to said sensing means for moving said sensing means with respect to said curve in dependence upon the amplitude of said component of said predetermined frequency in a sense such as to reduce said amplitude, and means connected to said sensing means for connecting said sensing means to said tool so that said tool follows said sensing means.*

*18. Tracer apparatus for causing a tool to follow a curve comprising curve sensing means, means connected to said sensing means for causing said sensing means to have a back and forth sensing movement at a predetermined frequency about a center in a direction generally transverse to said curve and at the same time advancing said sensing means so as to advance said center in a direction generally along said curve, whereby said sensing means scans successive elements of said curve to produce a signal, selective amplifier means connected to said sensing means for deriving from said signal the alternating current component of said signal having a frequency equal to said predetermined frequency, a servo motor having two phases, means connected to one of said phases for supplying to said one phase a potential of said predetermined frequency synchronized with said sensing movement, means for supplying said component to said other phase, means connecting said motor in steering relationship with said sensing means so that said motor steers said sensing means generally along said curve in accordance with the energization of said phases, and means connected to said sensing means for connecting said sensing means to said tool so that said tool follows said sensing means.*

*19. Tracer apparatus for causing a tool to follow a curve comprising curve sensing means, means connected to said sensing means for causing said sensing means to have a back and forth sensing movement at a predetermined frequency about a center in a direction generally transverse to said curve and at the same time advancing said sensing means so as to advance said center in a direction generally along said curve, whereby said sensing means scans successive elements of said curve to produce a signal, selective amplifier means connected to said sensing means for deriving from said signal the alternating current component of said signal having a frequency equal to said predetermined frequency, a servo motor having two phases, means connected to one of said phases for supplying to said one phase a potential of said predetermined frequency synchronized with said sensing movement, means for supplying said component to said other phase, means connecting said motor in steering relationship with said sensing means so that said motor steers said sensing means generally along said curve in accordance with the energization of said phases, means connected to said motor and in negative feedback relationship to said amplifier and responsive to the movement of said motor for suppressing overshooting of said sensing means as it is steered by said motor, and means connected to said sensing means for connecting said sensing means to said tool so that said tool follows said sensing means.*

*20. Line tracing apparatus for tracing a line comprising a photosensitive device having a photosensitive surface, means connected to said device for moving said surface back and forth transversely to said line in scanning relationship with said line to scan optically successive elements of said line, means connected to said device for deriving an electric current from said device dependent on the intensity of the light impinging on said surface as said surface scans said successive elements, and means connected to said deriving means and responsive to said current for steering said photosensitive device and orienting said scanning in response to changes in direction of said line and keeping the scanning generally transverse to and centered along said line.*

*21. Tracer apparatus for causing a tool to follow a curve on a surface comprising a scanning head having curve sensing means including driving means for causing said sensing means to scan back and forth in a straight line transversely to said curve, means connected to said scanning head for moving said head generally along said curve, means mounting said scanning head for rotation about an axis generally perpendicular to said curve and generally intersecting said surface substantially at said curve, and motor means connected to said scanning head and responsive to said sensing means for rotating said scanning head about said axis and steering said scan to keep its direction substantially constant with respect to the curve, said sensing means being offset from said axis in a direction such that said scan is in advance of said axis of said scanning head as said head is moved generally along said curve.*

*22. In a line tracing system for tracing a curve, a scanning head having a longitudinal axis and including sensing means and means for causing said sensing means to scan back and forth in a straight line transversely to said curve, and said scanning head also including means for mounting said scanning head rotatable about said axis, said sensing means being displaced with respect to said axis so that said sensing means is capable of scanning back and forth in advance of said axis.*

*23. In a line tracing system for tracing a stationary line in a field, a scanning head having an optical system for projecting an image of a portion of the field adjacent the stationary line to a plane within the scanning head, a photosensitive device within the scanning head and subjected to said image, oscillating means energized from alternating current for causing in effect periodic relative scanning movement of a portion of the image of the field*

*with respect to the photosensitive device in a direction back and forth in a straight line transverse to the stationary line in the field, means mounting said scanning head both for rotation about an axis passing through the scanning head and perpendicular to the field of the stationary line and also for bodily movement both transversely and longitudinally of the field, drive means for moving said scanning head bodily both transversely and longitudinally of the field, an alternating-current servo-motor for rotating said scanning head about its said axis, means responsive to said photosensitive device and having an alternating-current output controlled thereby for energizing said servo-motor with said alternating current to rotate said scanning head about said axis and keep the direction of said scanning perpendicular to said stationary line, and means to cause changes in the said alternating-current supplied to said servo-motor to also change the direction in which the drive means bodily moves said scanning head to cause it to move along said stationary line.*

*24. Tracer apparatus for causing a tool to follow a curve and including sensing means, drive means connected to said sensing means and energizable by an exciting periodic supply for causing said sensing means to scan said curve by sensing back and forth over successive elemental portions of said curve, restoring means connected to said sensing means for centering said back and forth sensing on said curve, and means connected to said restoring means and to be connected to said tool for moving said tool in accordance with said sensing means, said drive means having a two-pole stator and an armature, and means connected to said stator for periodically reversing the polarity of said stator to oscillate said armature, said armature being of the permanent-magnet type so that the instantaneous position of said sensing means while driven by said drive means has a constant unambiguous phase relationship with respect to the periodicity of said supply.*

*25. Tracer apparatus for causing a tool to follow a curve comprising curve sensing means, means connected to said sensing means for causing said sensing means to have a back and forth sensing movement at a predetermined frequency about a center in a direction generally transverse to said curve and at the same time advancing said sensing means so as to advance said center in a direction generally along said curve, whereby said sensing means scans successive elements of said curve to produce a signal, selective amplifier means connected to said sensing means for deriving from said signal the alternating current component of said signal having a frequency equal to said predetermined frequency, a servo motor having two phases, means connected to one of said phases for supplying to said one phase a potential of said predetermined frequency synchronized with said sensing movement, means for supplying said alternating current component from the selective amplifier means to said other phase, said motor rotating only when both said potential of said predetermined frequency and said alternating current component from the selective amplifier means are of appreciable amplitude and the direction of rotation depending on the phase relationship between the two supplies to said two phases to the motor, means connecting said motor in steering relationship with said sensing means so that said motor while its two phases are supplied as aforesaid steers said sensing means generally along said curve in accordance with the amplitude and relative phase relationship of the supplies to said two phases of the motor, and means connected to said sensing means for connecting said sensing means to said tool so that said tool follows said sensing means.*

References Cited in the file of this patent or the original patent

UNITED STATES PATENTS

| | | |
|---|---|---|
| 1,976,648 | Wittkuhns | Oct. 9, 1934 |
| 1,988,505 | Morandini et al. | Jan. 22, 1935 |
| 2,069,508 | Rutemiller et al. | Feb. 2, 1937 |
| 2,261,644 | Cockrell | Nov. 4, 1941 |
| 2,349,656 | Gulliksen | May 23, 1944 |
| 2,356,567 | Cockrell | Aug. 22, 1944 |
| 2,419,641 | Hart | Apr. 29, 1947 |
| 2,462,925 | Varian | Mar. 1, 1949 |
| 2,489,305 | McLennan | Nov. 29, 1949 |
| 2,499,178 | Berry et al. | Feb. 28, 1950 |
| 2,863,064 | Rabinow | Dec. 2, 1958 |
| 2,868,993 | Henry | Jan. 13, 1959 |
| 2,899,564 | Rabinow et al. | Aug. 11, 1959 |
| 2,933,668 | Brouwer | Apr. 19, 1960 |
| 3,017,552 | Brouwer | Jan. 16, 1962 |

FOREIGN PATENTS

| | | |
|---|---|---|
| 847,353 | Germany | Aug. 25, 1952 |

OTHER REFERENCES

Whitford et al.: Photoelectric Guiding of Astronomical Telescopes, Review of Scientific Instruments, vol. 8, March 1937, pp. 78–82.

The SCR–584 Radar, Part I, Electronics, November 1945, pp. 104–109.